United States Patent
Williams et al.

(10) Patent No.: US 10,250,295 B2
(45) Date of Patent: Apr. 2, 2019

(54) NETWORK FIELDBUS POWER SUPPLY (71) Applicants: Cooper Technologies Company, Houston, TX (US); David Gareth Williams, St. Albans (GB); Les John Price, Dunstable (GB)

(72) Inventors: David Gareth Williams, St. Albans (GB); Les John Price, Dunstable (GB)

(73) Assignee: EATON INTELLIGENT POWER LIMITED, Dublin (IE)

(*) Notice: Subject to any disclaimer, the term of this patent is extended or adjusted under 35 U.S.C. 154(b) by 356 days.

(21) Appl. No.: 14/916,277

(22) PCT Filed: Sep. 1, 2014

(86) PCT No.: PCT/GB2014/052645
§ 371 (c)(1),
(2) Date: Mar. 3, 2016

(87) PCT Pub. No.: WO2015/033119
PCT Pub. Date: Mar. 12, 2015

(65) Prior Publication Data
US 2016/0211887 A1 Jul. 21, 2016

(30) Foreign Application Priority Data
Sep. 3, 2013 (GB) .................................. 1315680.7

(51) Int. Cl.
*H02H 3/20* (2006.01)
*H04B 3/54* (2006.01)
(Continued)

(52) U.S. Cl.
CPC ............ *H04B 3/548* (2013.01); *H02H 3/202* (2013.01); *H02H 5/04* (2013.01); *H02M 3/04* (2013.01);
(Continued)

(58) Field of Classification Search
USPC ...................... 361/18, 86–87, 91.1
See application file for complete search history.

(56) References Cited

U.S. PATENT DOCUMENTS

| 2009/0015216 A1* | 1/2009 | Seberger | ............... H02M 3/155 323/234 |
| 2012/0019213 A1* | 1/2012 | Sainton | ................. H02J 7/0054 320/137 |

(Continued)

FOREIGN PATENT DOCUMENTS

| EP | 0 854 587 A1 | 7/1998 |
| WO | WO 2007/003254 A1 | 1/2007 |
| WO | WO 2011/085703 A1 | 7/2011 |

OTHER PUBLICATIONS

Chinese First Office Action dated Jul. 3, 2017 cited in Application No. 201480048325.5, 10 pgs.

(Continued)

*Primary Examiner* — Danny Nguyen
(74) *Attorney, Agent, or Firm* — Merchant & Gould P.C.

(57) ABSTRACT

The invention provides for a network power-supply voltage adaptor arranged to receive an input voltage (V in) from a network trunk cable and to present an internal voltage derived from the said input voltage (V in), the adaptor being arranged, when at least one of the input voltage (V in) or the said internal voltage is above a reference voltage (Ref V), to regulate the received input voltage (V in) to provide an adaptor output dc power supply voltage (V out) at a substantially constant dc power supply level less than that of the input voltage (V in), and independent of changes in the input voltage level (V in), and the adaptor further comprising at least one communication feed-through loop (55, 56, 66, 68) for the passage of substantially unaltered communications signals through the adaptor.

15 Claims, 6 Drawing Sheets (51) Int. Cl.
*H04B 3/56* (2006.01)
*H04L 12/10* (2006.01)
*H04L 12/40* (2006.01)
*H02H 5/04* (2006.01)
*H02M 3/04* (2006.01)

(52) U.S. Cl.
CPC ............... *H04B 3/56* (2013.01); *H04L 12/10* (2013.01); *H04L 12/40045* (2013.01); *H04B 2203/547* (2013.01); *H04B 2203/5483* (2013.01); *Y02D 50/30* (2018.01)

(56) References Cited

U.S. PATENT DOCUMENTS

| | | | |
|---|---|---|---|
| 2014/0055898 A1* | 2/2014 | Kostakis | H02H 3/20 361/91.5 |
| 2014/0125131 A1* | 5/2014 | Lalitnuntikul | G06F 1/266 307/31 |
| 2015/0212529 A1* | 7/2015 | Cherewka | G05F 1/56 323/303 |

OTHER PUBLICATIONS

International Search Report for corresponding International Patent Application No. PCT/GB2014/052645 dated Jan. 20, 2015.

\* cited by examiner

NETWORK FIELDBUS POWER SUPPLY

This application is a National Stage Application of PCT/GB2014/052645, filed 1 Sep. 2014, which claims benefit of Serial No. 1315680.7, filed 3 Sep. 2013 in Great Britain and which applications are incorporated herein by reference. To the extent appropriate, a claim of priority is made to each of the above disclosed applications.

BACKGROUND OF THE INVENTION

The present invention relates to a network power supply voltage adaptor and related method and network bus system and, in particular, but not exclusively, to a fieldbus power supply adaptor, and related system and method.

Bus network systems are commonly employed in situations where a variety of signals including power, control and measurement signals are to be delivered to, returned from, a variety of networked terminal devices. In many instances, the certainty with which a signal of particular characteristic, and in particular its voltage level, can be supplied to a network device can prove critical to the effective/safe operation of the device and even the whole network system. This is particularly the case in scenarios where the presence and operation of the various network devices may also have an impact on the signals supplied throughout the network and particularly by way of a common bus system.

In many instances, the bus system has to operate in accordance with specifications and set standards where it can prove disadvantageously limiting and inappropriate to rely on the compliance of such separate network devices in order to achieve overall bus system compliance. The architecture of such known systems can further prove disadvantageous in placing constraints on the location and physical size of the network and, in particular, the network bus system.

SUMMARY OF THE INVENTION

The invention seeks to provide for a network power supply adaptor, related method of power supply and related network bus system having advantages over known such adaptors, methods and systems.

According to one aspect of the present invention there is provided a network power supply voltage adaptor arranged to receive an input voltage from a network trunk cable and, when the level of the input voltage, or a proportion thereof, is above a threshold value, to regulate the received input voltage to provide an output do power supply voltage at substantially constant do power supply level independent of changes in the input voltage level, or the proportion thereof, above the threshold value.

Advantageously, the voltage can then be regulated in a manner independent of the compliance of one or more networked terminal devices and in a particularly effective, reliable and efficient manner. Thus, if the input voltage to the adaptor exceeds a predefined output voltage limit the adaptor circuit regulates its output to achieve the predefined voltage limit.

As part of a further advantage, the adaptor can include at least one communication feed-through arrangement for the passage of substantially unaltered communications signals through the adaptor.

The feed-through arrangement can include capacitive coupling and/or an active control circuit.

Further, a plurality of feed-through arrangements can be provided for different regions respectively of the frequency spectrum of the communications signals.

As required therefore, the voltage level delivered to the network trunk cable can be at a level sufficient to allow for the use of longer trunk cabling than might otherwise be the case.

In one arrangement the level of the constant output voltage, or a proportion thereof, can equate to the level of the threshold voltage.

Further, the adaptor can be arranged such that substantially no voltage reduction is applied if the input voltage, or the proportion thereof, falls below the threshold value, and the output voltage is then arranged to simply follow the input voltage.

Advantageously, all required functionality can be achieved in the adaptor in a way that allows communications signals to be passed substantially unaltered between input and output or between output and input.

As further features, the adaptor can include over voltage protection circuitry, and/or thermal protection circuitry.

In one particular embodiment the adaptor is arranged such that the voltage reduction is applied by way of a voltage dropper circuitry which can comprise a voltage dropper arranged to provide a linear voltage drop.

A particularly advantageous embodiment includes the use of at least one control loop.

In another embodiment the voltage dropper can comprise a switched mode device.

According to another aspect of the invention there is provided a bus network system including a network power supply voltage adaptor as defined above.

According to a further aspect of the invention, there is provided a method of adapting a power supply voltage from a network trunk cable and including the step of, when the level of the input voltage, or a proportion thereof, is above a threshold value, applying voltage regulation to the received input voltage to provide an output do power supply voltage at a substantially constant do power supply level, less than that of the input voltage and independent of changes in the input voltage level above the threshold value.

As noted above in relation to the adaptor, the constant output voltage employed in the method can equate to the level of the threshold voltage.

Also, the method can be arranged such that substantially no voltage reduction is applied if the input voltage, or a proportion thereof, falls below the threshold value and the output voltage then follows the input voltage.

Further, the step of voltage reduction can be applied by way of a voltage dropper circuitry, and such voltage dropper can be arranged to provide a linear voltage drop.

Advantageously, the method includes passing communications signals, substantially unaltered, through the adaptor.

One or more communication feed-through arrangements can also be employed within the method of the invention to achieve the required voltage drop in a manner transparent to any data signalling carried by the power supply.

The method can further include passing signals from different regions in the frequency spectrum of the communications signals through different respective feed-through arrangements. Capacitive coupling and/or active control loops can be employed in this regard.

The method is particularly useful for providing output to an intrinsically safe environment.

As will be appreciated, the present invention can prove particularly advantageous in providing a method of achieving Ex is compliance, particularly in accordance with the IEC 60079-11 Standard for intrinsic safety and the invention can find ready application in relation to complex bus network systems. The present invention can find particular application in relation to foundation fieldbus H1 or indeed other similar networks.

Further benefits can be derived from the present invention as the following discussions demonstrates, and with non-limiting reference to a foundation fieldbus implementation of the invention.

A typical foundation fieldbus segment consists of a fieldbus power supply unit arranged to supply current to a fieldbus spur wiring hub by way of a fieldbus cable that can be up to 1.9 kilometers in length. However it should be appreciated that the present invention can find ready application in relation to cable/trunk lengths in excess of such values and where such length is dependent on, or determined by, the operational characteristics/requirements of the particular network system.

In one of many possible non-limiting examples of the present invention, it can find application in situations wherein fieldbus spurs are connected to devices in an intrinsically safe hazardous area, and where it is necessary to apply current limitation and this is generally achieved by way of the wiring hub. Here also, the power supply voltage is to be limited and such limitation is usually provided by way of the fieldbus power supply unit. To allow the use of intrinsically safe devices with a Ui of 17.5V, the maximum voltage supplied is limited to 17.5V and this means that the fieldbus power supply would nominally be set to 17V or less. It is generally known that the fieldbus spur wiring hub has a minimum operating voltage in the order of 10V. Accordingly, and allowing for a 1V tolerance, it can be concluded that the maximum permitted voltage drop along the cable from the fieldbus power supply unit to the wiring hub should be in the order of 6V. With a standard type A fieldbus cable (44 ohms/loop km), this imposes a disadvantageous limitation on trunk cable length and current; such limitations being in the order of a cable length of 358 meters for a supply current of 380 mA, and a length in the order of 1 km for a supply current of 136 mA.

Through use of the present invention trunk cables of far greater length than this can be employed.

BRIEF DESCRIPTION OF THE DRAWINGS

The invention is described further hereinafter, by way of an example only, with reference to the accompanying drawings in which.

DETAILED DESCRIPTION OF THE PREFERRED EMBODIMENTS

Figure 1:
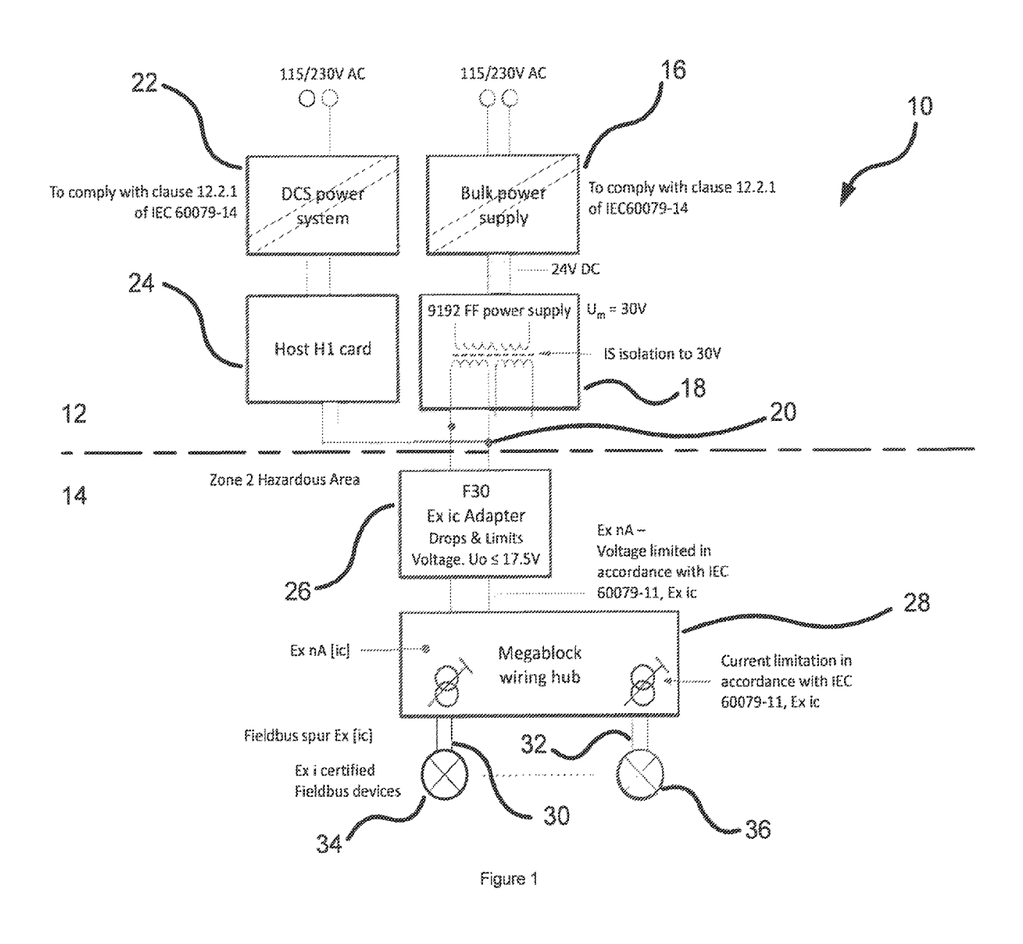
FIG. 1 is a schematic block diagram of a fieldbus arrangement according to an embodiment of the present invention.

Turning now to FIG. 1, as illustrated, a fieldbus system 10 arranged for supplying power and signalling from a first zone 12 comprising a non-hazardous environment, to a second zone 14, comprising a hazardous environment and in an intrinsically safe manner.

The elements of the fieldbus system 10 illustrated in the first zone 12 are of a standard design and configuration and in this example comprise a bulk power supply 16 arranged to receive mains power and to deliver a 24V DC signal to a fieldbus power supply unit 18 arranged to supply intrinsically safe isolation as required.

The fieldbus power supply unit 18 then delivers its output power supply signal by way of a fieldbus trunk 20 to network elements, such as terminal equipment, located in the second, hazardous, zone 14.

Also located in the first zone 12 in a standard manner is a distributed control system 22 also receiving mains supply and which is intended to offer isolation prior to its connection to a host H1 fieldbus card 24, in turn connected to the fieldbus trunk 20.

As is well known therefore, the fieldbus trunk 20 is arranged to supply not only the power required by the terminal equipment operating in the second zone 14, but also the control/measurement etc, signalling to be exchanged between the distributed control system 22, 24 and the terminal equipment such as field devices as discussed further below and as located within the second zone 14.

In the illustrated embodiment of the present invention of FIG. 1, the fieldbus trunk 20 is connected to a power supply adaptor 26 located in the second zone 14 which, in turn, serves to deliver power to a fieldbus spur wiring hub 28 in the form of a megablock wiring hub. In the illustrated example, the wiring hub 28 comprises a multi drop configuration providing a first 30, and a second 32 fieldbus spur connected respectively to two terminal equipment devices such as first and second fieldbus devices 34, 36 which can of course comprises any appropriate field device for receiving and or supplying control/data signaling.

While, for ease of reference, the adaptor 26 is illustrated separate from the wiring hub 28, it will of course be appreciated that the functionality of both elements 26, 28 can be provided in a integrated manner within a single network device.

As discussed further below, the adaptor 26 is arranged to provide both voltage dropping and voltage limitation with regard to the voltage it receives from the fieldbus trunk 20. The "dropped" voltage is then delivered to the wiring hub 28 and onward to the fieldbus devices 34, 38.

As will be appreciated, the functionality of the adaptor of the present invention advantageously provides for a separate control element serving to achieve compliance with appropriate network/safety standards and in a manner which places far less reliance upon the compliance exhibited by other network devices. The adaptor of the illustrated embodiment is provided in series with the trunk input of the wiring hub 28 and advantageously allows for higher currents to be provided with significantly longer trunk cable lengths by allowing use of a higher output voltage from the fieldbus power supply 18 which can be 19V or greater.

As discussed in further detail with reference to FIGS. 2 and 3; and FIGS. 4 and 5, the illustrated embodiments of the present invention provide two main functions. The first is to drop the incoming voltage, for example to a level between 11V and 17V, and the second is to provide over-voltage protection as required by the relevant safety standards. Further, this is achieved in a way that allows communications signals to be passed substantially unaltered between input and output or between output and input. These functions are advantageously implemented with a minimum of trunk current drain. Further, the adaptor 26 can also include thermal protection circuitry arranged to turn the output off in an event of excessive temperature being detected. Such an event would normally be due to operation outside of the specified conditions.

With regard to the voltage dropping aspect of the present invention a voltage reduction circuit is provided to drop, in a linear manner, the incoming voltage from the fieldbus trunk 20 to an appropriate output voltage of, say 15V. The reduction circuit is arranged such that if the voltage drops below the regulated level, then the output voltage will simply follow the input voltage down to a minimum level of, say 10V as is required for operation of the wiring hub 28.

A particular implementation is described further below with initial reference in particular to FIGS. 2 and 3.

As noted above, and with initial reference to FIGS. 1-3, a trunk input of a voltage dropper circuit 38 of an adaptor 26 according to an embodiment of the present invention is arranged to be connected, via a length of trunk cable 20, to a DC power source 16, 18 that has been also been conditioned to support digital communication.

In operation, if the input voltage to the voltage dropper 38 exceeds a predetermined output voltage limit, the voltage dropper 38 serves to regulate its output by way of a series voltage-adjustment element 40 to achieve the predefined voltage limit.

The output voltage of the voltage dropper circuit 38 is monitored by a control circuit 42 and compared against a voltage reference 44. Any difference noted from this comparison is employed within a negative feed-back loop to adjust the series voltage-adjustment element 40 to achieve the required regulated DC output via element 42B of the control circuit 42.

If the applied input voltage is too low to achieve such regulation, the output voltage of the voltage dropper 38 tracks the input voltage at a level marginally below the trunk input voltage. The control circuit 42 also includes an element 42A arranged to allow digital communication signals to pass from input to output, or from output to input as required, with negligible modification to the wave shape or amplitude.

Figure 2:
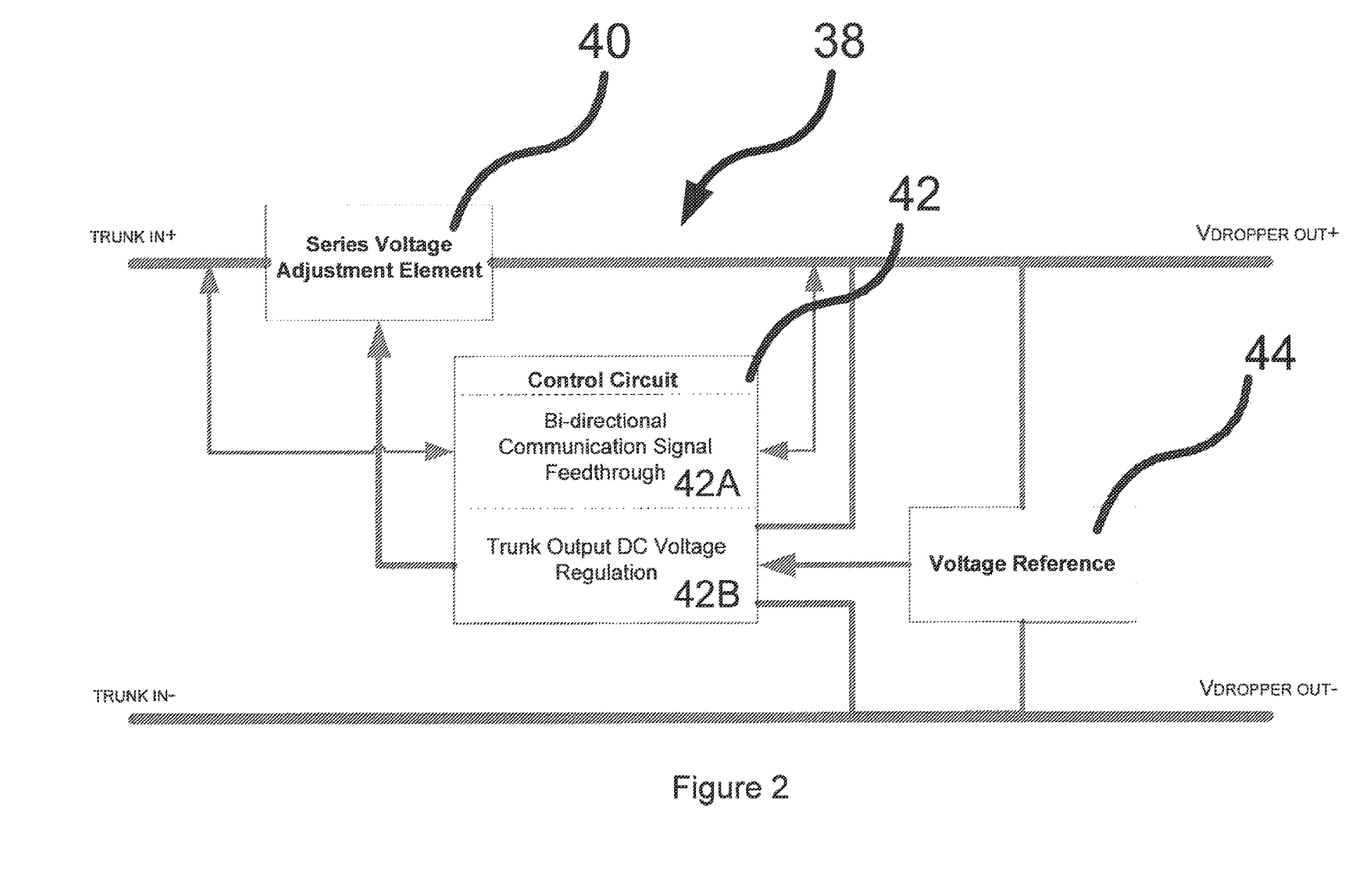
FIGS. 2 and 3 are schematic block diagrams of examples of a voltage-adjusting element of a power supply adaptor according to an embodiment of the present invention and as employed in the system illustrated with reference to FIG. 1.
Figure 3:
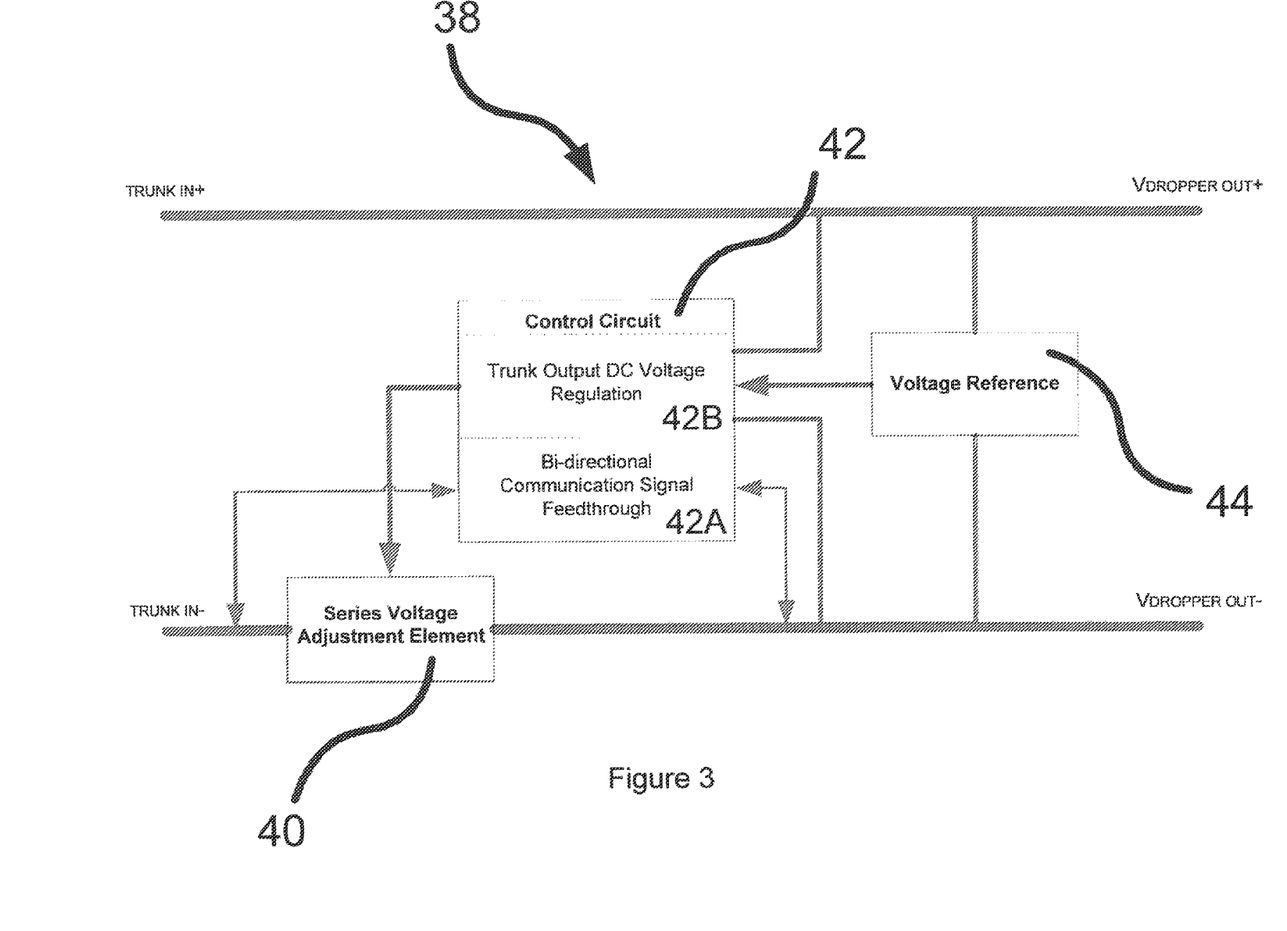

FIG. 2 illustrates the series voltage adjustment element 40 in the positive voltage path of the voltage dropper 38, whereas FIG. 3 shows an alternative configuration with the same elements 38, 40, 42 and 44 but with the series voltage-adjustment element 40 in the negative voltage path of the voltage dropper circuit 38.

In some applications, it will be necessary to limit the trunk voltage applied to devices connected downstream and in a particular embodiment of the present invention, it is intended that the output of the voltage dropper 38 feeds directly into the input of a voltage limiter circuit.

Figure 4:
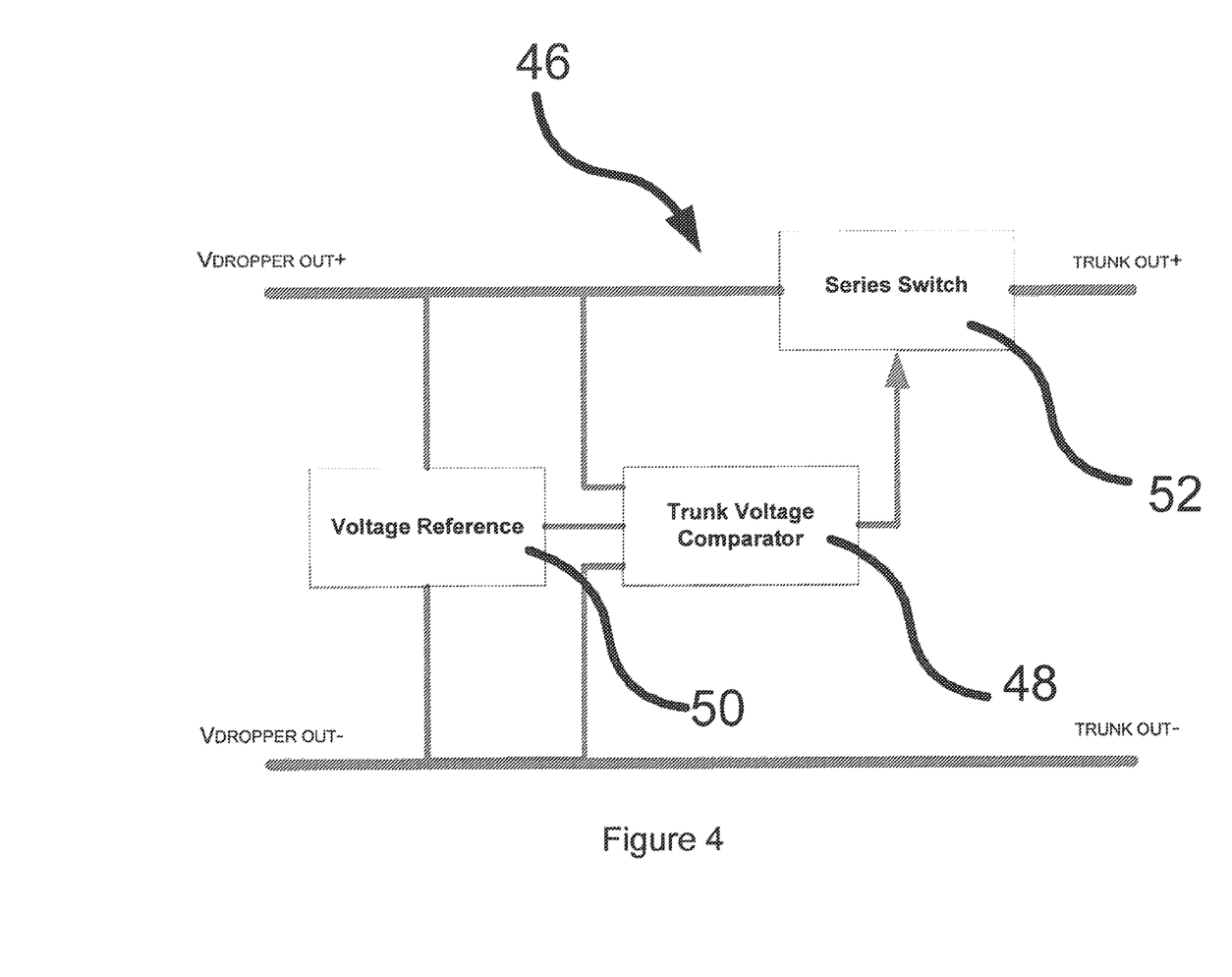
FIGS. 4 and 5 are schematic block diagrams of examples of a voltage-limiting element of a power supply adaptor according to an embodiment of the present invention and as employed in the system illustrated with reference to FIG. 1.
Figure 5:
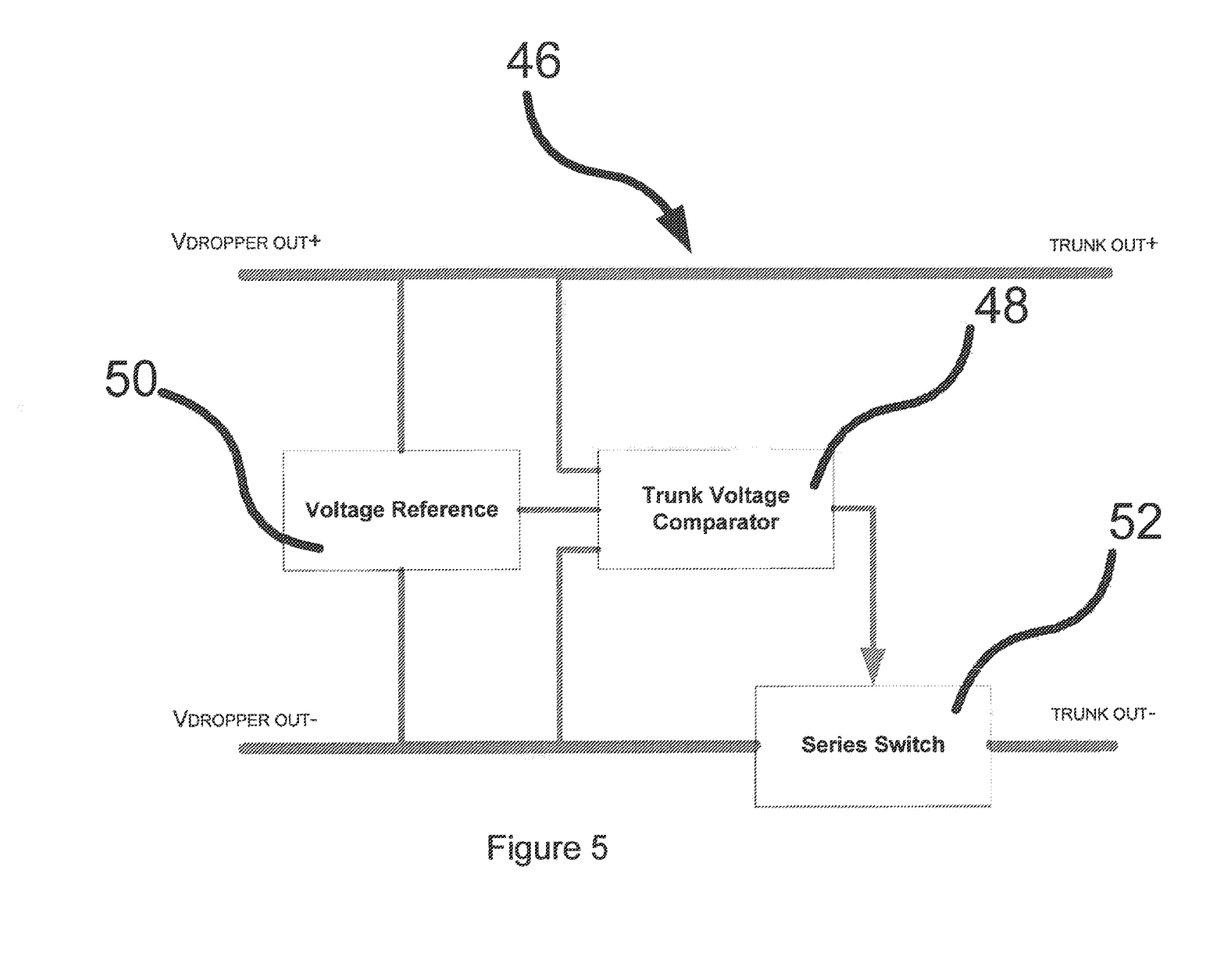

Turning now to FIGS. 4 and 5, there is provided a schematic illustration of such a voltage limiter 46 of an adaptor 28 according to an embodiment of the present invention.

When used in conjunction with the voltage dropper circuit 38, the voltage limit of the voltage limiter circuit 46 is arranged to be set sufficiently above that of the voltage dropper output to avoid any significant modification to the wave shape or amplitude of the digital communications signals passing through the adaptor 26.

The input voltage of the voltage limiter circuit 46 received from the voltage dropper 38 such as that of FIGS. 2 and 3, is monitored by a trunk-voltage comparator 48 and compared against a reference voltage 50. If it is determined that the output voltage equals or exceeds, the predefined limit voltage, the comparator 48 serves to drive a series switch 52 to assume a high-Impedance mode by preventing a supply of current being available at the output of the voltage limiter 46 and thus the adaptor 26.

FIG. 4 shows a series switch 52 in the positive voltage path of the voltage limiter circuit 46, and FIG. 5 shows an alternative configuration with the series voltage switch 52 in the negative voltage part of the voltage limiter circuit 48.

It should be appreciated that the voltage reduction circuit can also be implemented by way of non-linear arrangement, such as a switch mode circuit. This would exhibit the advantage of reducing power dissipation and so allowing for a greater voltage drop within the device and thus the use of longer cable lengths.

Advantageously, the output voltage is regulated by means of one or more control loops which ensure that fieldbus communications signals from/to the fieldbus devices remain substantially, i.e. effectively unaffected on their passage in either direction through the adaptor. Such control loops can be provided to ensure that the communication signals on the incoming trunk 20 appear unaltered on the output of the adaptor 26 to the field wiring hub 28, and similarly, that the communication signals on the wiring hub 28 appear via the adaptor 26 on the fieldbus trunk 20 in a transparent manner.

Figure 6:
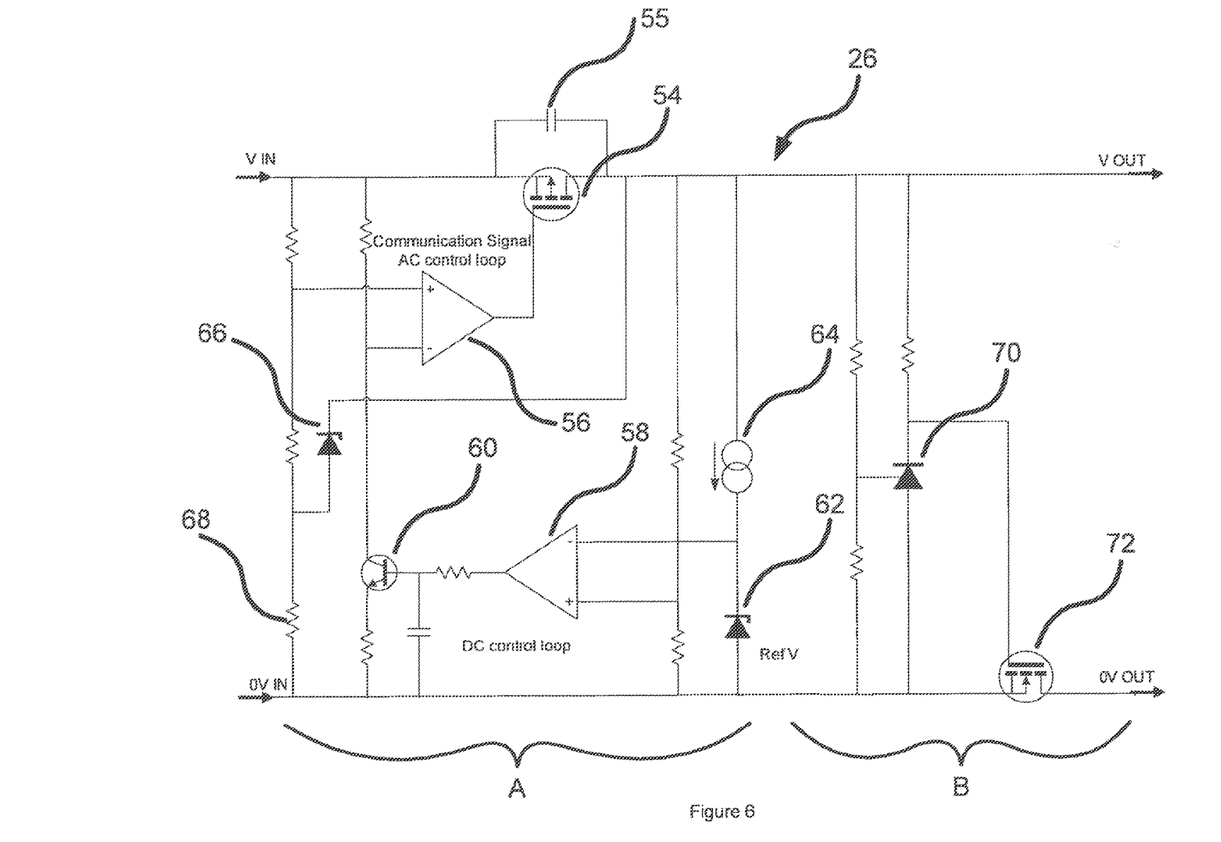
FIG. 6 is a circuit diagram showing further details of an example of an adaptor according to an embodiment of the invention.

Turning now to FIG. 6, there is provided a circuit diagram of one example of an adaptor 26 according to an embodiment of the present invention.

The adaptor 26 is arranged to receive an input voltage V IN from a trunk cable such as the trunk cable 20 of FIG. 1, and to supply an output voltage V OUT for onward delivery to, for example, the wiring hub 28 of FIG. 1.

The adaptor 26 comprises circuit elements such as those discussed in relation to FIG. 2 and FIG. 3; and FIG. 4 and FIG. 5, and including a voltage dropper section A with integrated feature of communication signal pass-through between input and output, or between output and input, sides of the voltage dropper section A, and an overvoltage switch section B.

Referring first to the voltage dropper section A, there is provided series voltage adjustment element 54, in this example provided in the positive voltage path of the voltage dropper 26, and comprising a P-channel FET arranged to pass the incoming voltage, when less than 15V, directly to the output of the adaptor 26 via the overvoltage switch section B, or to limit the output voltage to a nominal 15V when the incoming voltage is above that level. An enhanced frequency response for the voltage dropper section A is provided by a capacitance 55 in parallel with the P-channel FET 54 and serving to facilitate the passage of substantially undistorted communication signals between input and output or between output and input. Accurate signal replication is achieved for higher frequencies of the communication signal by the capacitive coupling provided by the capacitance 55. For lower frequencies of the communication signal, an active control loop can be provided to achieve the required accurate signal passage through the adaptor. It will also be appreciated that the required accurate signal replication could be achieved by active control for the full communication signal bandwidth, or by capacitive coupling for the full communication signal bandwidth.

From FIG. 3, it will also be appreciated that this functionality can be provided on the low power rail and, of course, such functionality could be provided by any appropriate one or more semi-conductor components.

The actual voltage control is achieved by way of a voltage control circuit 56, 58 comprising a dual-operation amplifier arrangement configured such that the output voltage is regulated to a maximum of 15V and communication signalling is copied, substantially unaltered, from the input to output, or from output to input, of the adaptor 26 as required.

Again, such functionality could also be performed by way of discrete semiconductor components. An operational amplifier 56 provides for a communication signal AC control loop, whereas the operational amplifier 58 in conjunction with the operational amplifier 56, provides for a slower DC control loop. Further, a transistor 60 is provided as a level-shifter within the DC control loop of the operational amplifier 58 and diode component 62 serves to provide for a reference voltage to allow the output voltage to be controlled to a nominal 15V. A low-constant current source 64 is also provided to supply the voltage reference diode 62 such that the reference voltage is unaffected by the communication signalling and the trunk-load current drawn by the adaptor 26 is then suitably stable. A zener diode 66 with resistor 68 provide for a version of the output with a negative offset voltage to ensure operational amplifier 56 has a practical operating point.

Turning now to the overvoltage switch element B, in this illustrated example, this includes a shunt voltage regulator device 70 employed to monitor the output voltage and, in the event of the output voltage exceeding a specified maximum, for example 17.5V, the output voltage is removed. While a shunt-voltage regulatory integrated circuit is employed as an example, the same functionality could of course be provided using discrete semiconductors and/or other integrated circuit devices.

An N-channel FET 72 comprises a control element which serves to disconnect the output in the event of identification of an overvoltage condition but again, this functionality can also be provided in the high side power rail (V IN).

Of course, a variety of alternatives readily exist and one alternative protection method comprises the inclusion of an output voltage clamp using either silicone control rectifier or an alternative semiconductor solution.

It should of course be appreciated that the invention is not restricted to the details of the illustrated embodiment.

That is, the invention can be applied in relation to any appropriate complex bus network system and in particular those seeking readily compliant control of network power supply signals that are also sensitive to the data being carried on the network.

The adaptor can therefore be employed in relation to any appropriate hub or device coupler and in relation to any appropriate configuration of single drop, or otherwise, fieldbus devices. Also, the invention is not restricted in any way to the details implied from the particular power supply and Distributed Control System of the illustrated embodiments.

The invention claimed is:

1. An apparatus comprising:
a voltage dropper section configured to:
receive an input voltage and a communication signal at an input of the voltage dropper section,
regulate the input voltage, and
provide the regulated input voltage and the communication signal on an output of the voltage dropper section; and
an overvoltage switch section connected in parallel with the voltage dropper section wherein the overvoltage switch section being connected in parallel with the voltage dropper section comprises an input of the overvoltage switch section being connected to the output of the voltage dropper section, the overvoltage switch section being configured to;
receive, on the input of the overvoltage switch section, the regulated input voltage and the communication signal,
monitor the regulated input voltage provided from the voltage dropper section, and
remove the regulated input voltage and the communication signal from an output of the overvoltage switch section when the monitored regulated input voltage from the voltage dropper section exceeds a specified maximum wherein the overvoltage switch section being configured to remove the regulated input voltage and the communication signal comprises the overvoltage switch section being configured to use a control element connected to a shunt voltage regulator device connected across the output of the overvoltage switch section.

2. The apparatus of claim 1, wherein the voltage dropper section being configured to receive the input voltage and the communication signal at the input of the voltage dropper section comprises the voltage dropper section being configured to receive the input voltage and the communication signal from a trunk cable.

3. The apparatus of claim 1, wherein the voltage dropper section being configured to regulate the input voltage comprises the voltage dropper section being configured to use a dual-operation amplifier wherein the regulated input voltage is regulated to a maximum level and the communication signal is provided, substantially unaltered, between the input of the voltage dropper section and the output of the voltage dropper section.

4. The apparatus of claim 1, wherein the voltage dropper section being configured to provide the communication signal on the output of the voltage dropper section comprises using capacitive coupling for higher frequencies of the communication signal and an active control loop for lower frequencies of the communication signal.

5. The apparatus of claim 1, wherein the overvoltage switch section being configured to monitor the regulated input voltage comprises the overvoltage switch section being configured to use the shunt voltage regulator device connected across the output of the overvoltage switch section.

6. The apparatus of claim 1, wherein the output of the overvoltage switch section is connected to a wiring hub.

7. A method comprising:
receiving an input voltage and a communication signal at an input of a voltage dropper section of an adaptor;
regulating, by the voltage dropper section, the input voltage;
providing, by the voltage dropper section, the regulated input voltage and the communication signal;
receiving, on an input of a overvoltage switch section of the adaptor, the regulated input voltage and the communication signal, the overvoltage switch section connected in parallel with the voltage dropper section wherein the overvoltage switch section being connected in parallel with the voltage dropper section comprises the input of the overvoltage switch section being connected to the output of the voltage dropper section;
monitoring, by the overvoltage switch section, the regulated input voltage provided from the voltage dropper section; and
removing, by the overvoltage switch section, the regulated input voltage and the communication signal from an output of the overvoltage switch section when the monitored regulated input voltage from the voltage dropper section exceeds a specified maximum wherein removing the regulated input voltage and the communication signal comprises using a control element connected to a shunt voltage regulator device connected across the output of the overvoltage switch section.

8. The method of claim 7, wherein receiving the input voltage and the communication signal at the input of the voltage dropper section comprises receiving the input voltage and the communication signal from a trunk cable.

9. The method of claim 7, wherein, removing the regulated input voltage and the communication signal from the output of the overvoltage switch section comprises removing the regulated input voltage and the communication signal from the output of the overvoltage switch section wherein the output of the overvoltage switch section is connected to a wiring hub.

10. The method of claim 7, wherein providing, by the voltage dropper section, the regulated input voltage and the communication signal comprises using capacitive coupling for higher frequencies of the communication signal and an active control loop for lower frequencies of the communication signal.

11. The method of claim 7, wherein regulating, by the voltage dropper section, the input voltage comprises using a dual-operation amplifier arrangement wherein the regulated input voltage is regulated to a maximum level and the communication signal is provided, substantially unaltered, between the input of the voltage dropper section and the output of the voltage dropper section.

12. The apparatus of claim 1, wherein the control element is provided in a high side power rail of the output of the overvoltage switch section.

13. The apparatus of claim 1, wherein the control element is provided in a ground side power rail of the output of the overvoltage switch section.

14. The method of claim 7, wherein removing the regulated input voltage and the communication signal comprises removing the regulated input voltage and the communication signal wherein the control element is provided in a high side power rail of the output of the overvoltage switch section.

15. The method of claim 7, wherein removing the regulated input voltage and the communication signal comprises removing the regulated input voltage and the communication signal wherein the control element is provided in a ground side power rail of the output of the overvoltage switch section.

* * * * *